United States Patent Office.

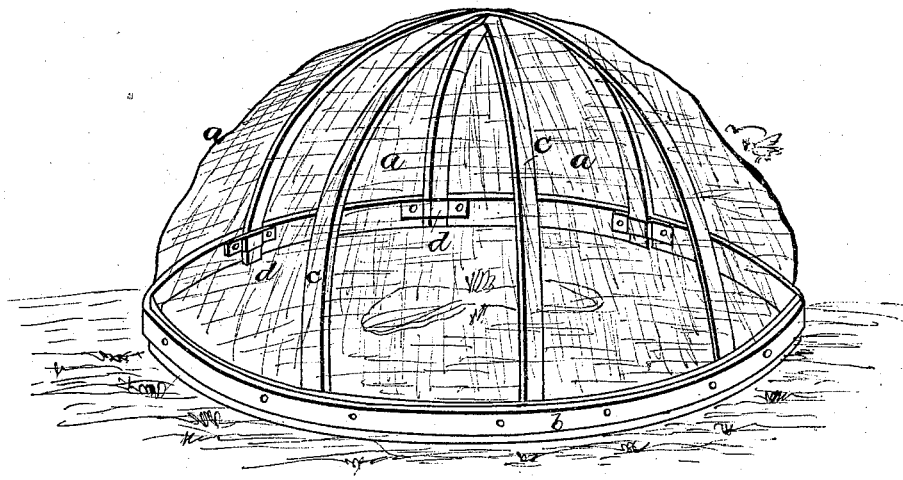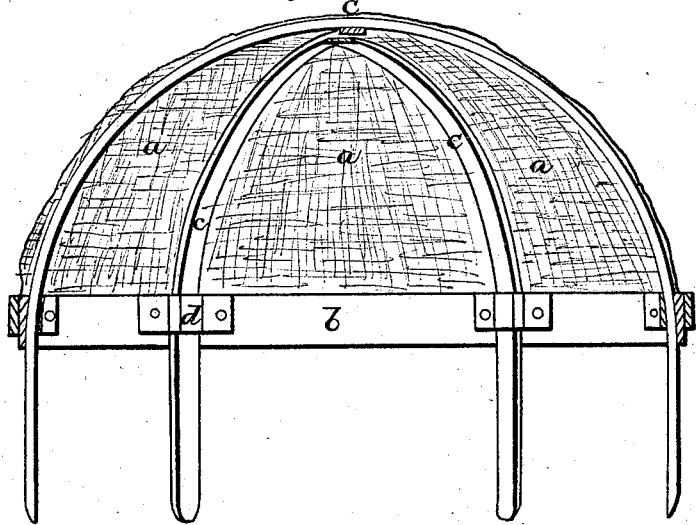

WATSON N. SPRAGUE, OF KEENE, NEW HAMPSHIRE.

Letters Patent No. 98,892, dated January 18, 1870.

IMPROVEMENT IN PLANT-PROTECTORS.

The Schedule referred to in these Letters Patent and making part of the same

*To all whom it may concern:*

Be it known that I, WATSON N. SPRAGUE, of Keene, in the county of Cheshire, and State of New Hampshire, have invented a new and improved Plant-Protector; and I do hereby declare that the following is a full and exact description thereof, reference being had to the accompanying drawings, and to the letters of reference marked thereon.

My protector is intended for the same purpose as others bearing the name, viz, for protecting young plants from insects, worms, &c., at the same time affording some shelter from hard winds and rains, and early frosts.

Figure 1 represents an exterior view of the protector, in use, with the supporting-sticks thrust into the ground.

Figure 2 is an interior view.

The hoop or ring $b$ is laid on the ground, or pressed into the ground, the netting $a$ being supported by the sticks or hoops $c$.

In the transportation of plant-protectors which have the supporting-stick come separately, there is always danger of the stick losing; while in plant-protectors which have the supporting-sticks secured to and fastened to themselves, there is great difficulty in packing them in a small compass.

It is proposed to obviate these difficulties by making the supporting-sticks or hoops adjustable, and also of such a size and length that they can be packed inside the hoop $b$, thus making but one package, and economising space.

The supporting-sticks or hoops $c$ slip in and out of the tins $d$, thus making the sticks adjustable.

I do not claim the hoop $b$ as my invention, neither do I claim a supporting-hoop or stick which comes down simply to the surface of the ground.

I claim nothing whatever that is mentioned in United States patent No. 87,313, as my method of constructing a plant-protector is entirely different from that described in the above-named patent, my sticks or supporters being detachable, and that, not.

What I claim, and desire to secure by Letters Patent, is—

The adjustable hoops or sticks $c$, three or more in number, extending six inches or more below the ring $b$, combined with the tins $d$, for the purpose of holding the hoops $c$ in place, in the manner above described, in a plant-protector.

WATSON N. SPRAGUE.

Witnesses:
AMOS F. FISKE,
JAMES BURNAP.